June 23, 1959 R. L. RATHER 2,891,501
ARTICULATED TOW CHAIN
Filed May 6, 1953 2 Sheets-Sheet 1

INVENTOR
ROY L. RATHER
BY W. R. Maltby
D. O. Snyder
ATTORNEYS

June 23, 1959 R. L. RATHER 2,891,501
ARTICULATED TOW CHAIN
Filed May 6, 1953 2 Sheets-Sheet 2

INVENTOR
ROY L. RATHER

BY W.R. Maltby
D.G. Snyder
ATTORNEYS

United States Patent Office 2,891,501
Patented June 23, 1959

2,891,501

ARTICULATED TOW CHAIN

Roy L. Rather, Houston, Tex., assignor, by mesne assignments, to the United States of America as represented by the Secretary of the Navy Application May 6, 1953, Serial No. 353,261

1 Claim. (Cl. 114—235)

This invention relates to articulated tow chains and more particularly to a tow chain for towing underwater objects behind or beneath a moving vessel.

In marine operations considerable use is made of cables and chains for towing objects from relatively rapidly moving vessels. In many instances the towed object may contain delicate instruments that would be disturbed by vibration in the towing cable. Considerable difficulty has been encountered in the past in eliminating vibrations from the towing cable. Generally, the means previously used to eliminate such vibration include applying fairing to the cable or shaping the cross section of the cable to permit an easier passage of the cable through the water. All of the previously tried methods have been only partially successful in eliminating the vibration and while operating at relatively high speed, other difficulties are apt to arise such as kiting out to one side. In time, the vibration weakens the cable by setting up fatigue stresses and necessitates the use of heavy and somewhat awkward reeling devices for securing the cable to the towing vessel. Furthermore, damage may result to the fairing during the reeling operation. For this reason, it is sometimes necessary to remove the fairing before the cable can be reeled. The problem is still further complicated if it is necessary that the fairing and/or the towing cable include electrical cables, hydraulic or pneumatic lines which may act as controls for the towed object or for the instruments within same.

Therefore, it is an object of the present invention to provide a tow chain that is free of vibration even at high towing speeds.

It is a further object of the invention to provide a tow chain relatively free from fatigue stresses caused by vibration in the cable.

Another object of the invention is to provide a vibration free cable to which fairing can be readily attached and which can be easily reeled.

Still another object of the invention is to provide a tow chain that will transmit torque from the towing vessel to and/or into the towed object.

An additional object of the invention is to provide a tow chain that will provide greater protection to electrical, hydraulic or pneumatic connections to the towed object than do previous types of towing cables.

These and other objects of the present invention which will appear from the following detailed description are generally provided by constructing the tow chain of a plurality of rigid rodlike links joined in tandem by universal joints with or without fairing and which may be hollow to receive electrical, hydraulic or pneumatic control lines. Certain preferred embodiments of the invention have been illustrated in the drawing in which.

Figure 1:
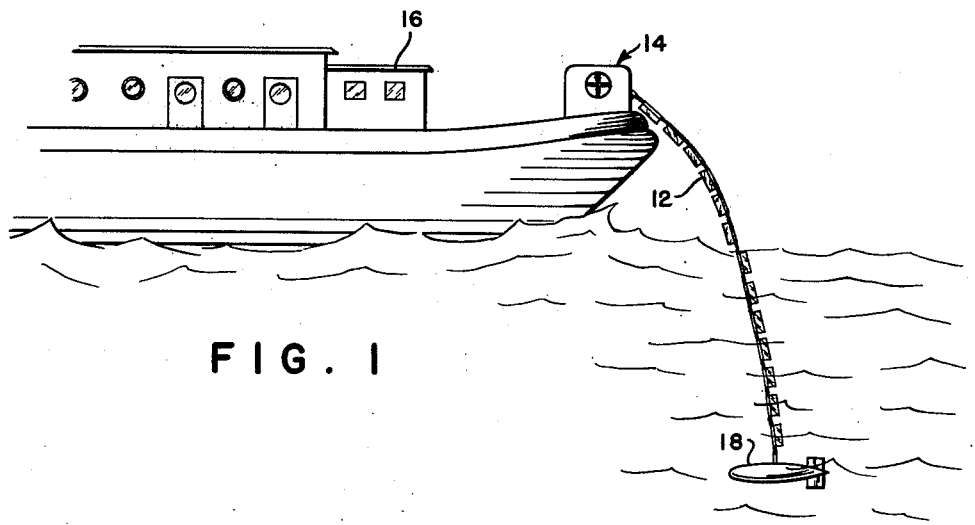
Fig. 1 is a pictorial view showing the manner in which the tow chain of the present invention may be connected between the towing vessel and the towed object. Many different methods can be imagined as, for example, towing from the side of a vessel.

In Fig. 1 the articulated tow chain 12 is shown attached to a reeling device 14 mounted on towing vessel 16. Reeling device 14 is preferably constructed with a hexagonal or other multisided reeling drum in place of the usual round reeling drum used for cables and chains. If the articulated tow chain 12 has fairing members attached to the various links, it may be desirable to provide the reeling device 14 with guides for alining the fairing members as the cable is reeled in and out. However, the details of reeling device 14 form no part of the present invention and the above explanation is included merely to point out one way of conveniently handling the articulated tow chain. The end of tow chain 12 remote from towing vessel 16 is secured to the towed object 18 in any convenient manner.

Figure 2:
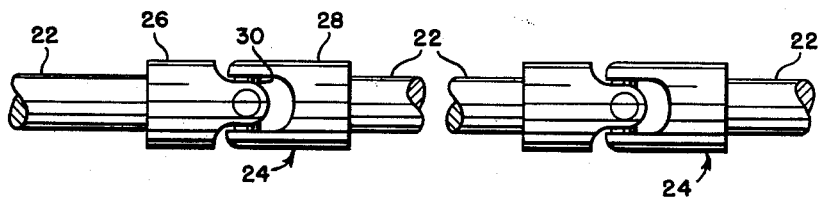
Fig. 2 is a detailed view of one preferred embodiment of the present invention.

Referring now to Fig. 2 it can be seen that the articulated tow line consists of a number of rodlike links 22 joined in tandem by universal joints 24. As shown in Fig. 2, universal joints 24 consist of two U-shaped yokes 26 and 28 joined by a cross-shaped member 30, the ends of which are journaled in the extremities of yokes 26 and 28. Chain vibration increases as the length per link is increased and as the mass per link is reduced. Other factors enter into the vibration equation. It has been found experimentally that a link 22 that is 24 inches long and weighing approximately 10 pounds can be towed through the water substantially free of vibration even without fairing at any ship speed up to the maximum tested which was 24 knots. It has also been found that a chain made up of 6-inch links with ¼ inch diameter solid steel rod and ½ inch outside diameter universal joints operates free of vibration without fairing.

Figure 3:
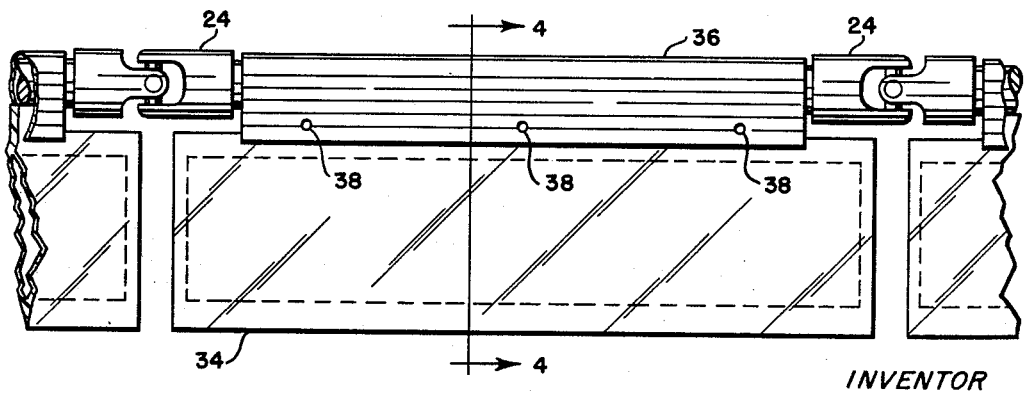
Fig. 3 is a detailed view of the tow chain of Fig. 2 with the addition of a fairing member.
Figure 4:
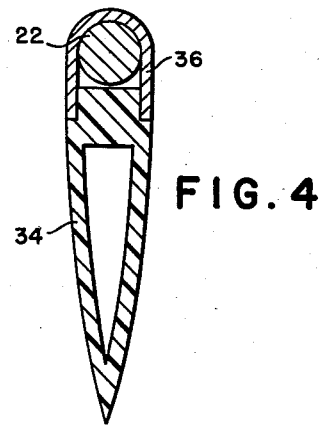
Fig. 4 is a cross-sectional view of the faired tow chain of Fig. 3 taken along the line 4—4 of Fig. 3.

Although the cable of Fig. 2 is relatively free of vibration, the drag on the cable as it passes through the water may be greater than is desirable in certain instances. Figs. 3 and 4 illustrate a sectional fairing that is found to be highly advantageous in reducing the drag of the articulated tow chain. The fairing consists of a streamlined, hollow member 34 which is freely and rotatably mounted on link 22 by means of a U-shaped member 36. Members 34 and 36 may be formed of plastic and metal respectively or of any other suitable material. Member 36 is fastened to member 34 by appropriate fastening devices, for example, rivets 38. Preferably member 34 should extend in a partially overlying relationship with respect to universal joints 24 in order that maximum streamlining of the line may be achieved. However, member 34 should not extend to the center of the universal joint, otherwise interference between two adjacent fairing sections may occur as the line is flexed. Member 36 which forms the leading edge of the fairing section preferably has a width that is slightly less than the outside diameter of the universal joints 24. If this relationship is maintained, a reeling drum may be constructed that contacts the articulated tow chain only at the universal joints so that the chain may be reeled with no danger of injury to the fairing device. In many applications it is desirable to have the fairing device slightly buoyant to increase the hydrodynamic stability of the fairing. The only other requirements imposed on the fairing device is that the device properly streamline the chain and have sufficient strength to withstand the forces acting on it as it passes through the water. It should be obvious that the fairing device may be constructed of materials other than those specified, for example, of rubber, aluminum or stainless steel. It has been found that a faired articulated tow chain as illustrated in Figs. 3 and 4 is relatively free of vibration at all towing speeds and has a drag that is a very small percentage of that of a tow cable of similar diameter without fairing.

Figure 6:
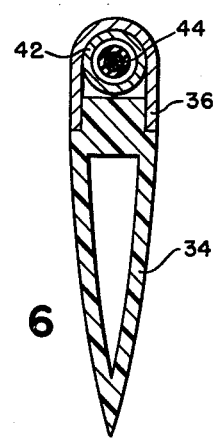
Fig. 6 is a cross-sectional view of the tow chain of Fig. 5 taken along the line 6—6 in Fig. 5.
Figure 5:
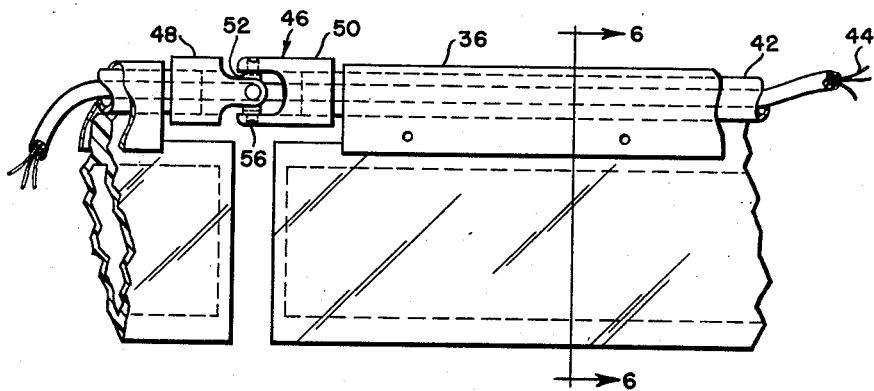
Fig. 5 is a detailed view of a second embodiment of the invention which is made hollow to receive an electrical cable.
Figure 7:
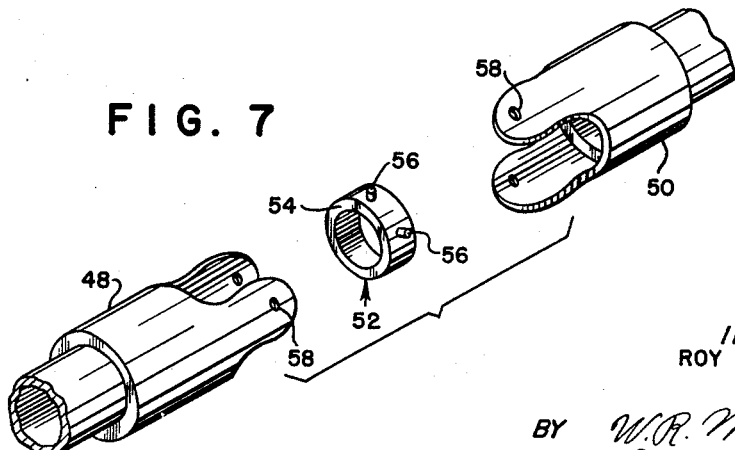
Fig. 7 is an exploded view of the tow chain of Fig. 5 shown without the fairing.

Figs. 5, 6 and 7 illustrate a second preferred embodiment of the invention in which links 42 are made hollow to permit the passage of an electrical conductor 44. Universal joints 46 are constructed of U-shaped yokes 48 and 50 which are similar to yokes 26 and 28 of Fig. 2. The member 52 connecting yoke 48 to yoke 50 is also made hollow as illustrated in Fig. 7. As shown in Fig. 7, connecting member 52 consists of a ring 54 having an outer diameter substantially equal to the inside dimensions of yokes 48 and 50 on which are mounted four bearing pins 56 spaced 90° apart on ring 54. Opposite pairs of pins 56 are journaled in bearing openings 58 in yokes 48 and 50, respectively. To prevent a pull or push action being applied to the electrical conductors that pass through the annular space when the articulate cable is bent at a joint as when wound on a reel, for example, member 52 may be modified. The major detail of said modification includes displacing one set of opposite pins from the other set. One set of opposite pins will act in one plane and the other set will act in another plane.

It can be seen that the tow chain illustrated in Figs. 5 through 7 has substantially the same towing characteristics as the tow chain illustrated in Figs. 3 and 4 and provides the additional feature of a protected channel through the center of the tow chain for the electrical cable 44 or other communicating means, for example, mechanical cables hydraulic or pneumatic lines. The tow chain illustrated in Figs. 5 through 7 is preferable to towing cables having the electrical conductors integrally formed therein for the reason that electrical cable 44 may be easily removed from the tow chain and a different cable or different form of controlling device may be threaded through the tow chain.

The various embodiments of the tow chain which have been illustrated or described have sufficient flexibility so that they may be used wherever towing cables or towing chains are now employed with the advantages pointed out above that the tow chain of the present invention is relatively free from vibration and has a relatively low drag. The tow chain of the present invention has the additional advantage that torque or turning movement may be transmitted from the towing vessel along the tow chain to and/or into the towed object. While in many instances exact rotary movement cannot be transmitted along a long length of the tow chain, it has been found that in movements involving turning of the towing vessel the torque transmitted along the tow line provides a satisfactory reference of the towing ship's head within the towed object. This characteristic is most useful when the instruments within the fish must be trained relative to their own ship's head. If the length of the tow chain to be employed is known and a suitable swivel is provided at some point adjacent the point of attachment of the tow chain to the towing vessel, sufficient rotary movement may be transmitted along the tow chain to control the operation of instruments located within the towed object. This control can be accomplished by providing an attaching member on the towed object which is free to rotate without altering the course of the towed object and which is attached by suitable linkages to instruments within the towed object.

While what has been described is at present considered to be the preferred embodiments of the invention, it will be obvious to those skilled in the art that various changes and modifications may be made therein without departing from the scope of the invention as pointed out in the hereinafter appended claim.

What is claimed is:

An articulate marine tow chain comprising a plurality of tubular rigid links, a plurality of universal joints coupling said links in tandem whereby a torque may be transmitted along the chain so formed, each of said universal joints including a pair of tubular U-shaped yokes which are secured to the confronting ends of adjacent links of said chain, a plurality of rigid fairings, each of said fairings being rotatably mounted on a different link of said chain and being restrained by the U-shaped yokes secured to its associated link from longitudinal movement along said chain and said fairings having end portions extending beyond the length of each link behind each U-shaped yoke whereby substantially the entire submerged length of said chain may be faired.

References Cited in the file of this patent

UNITED STATES PATENTS

| | | |
|---|---|---|
| 1,350,423 | Runkel | Aug. 24, 1920 |
| 2,397,957 | Freeman | Apr. 9, 1946 |
| 2,401,783 | Wilcoxon | June 11, 1946 |
| 2,554,634 | Paine et al. | May 29, 1951 |
| 2,667,531 | McLoad | Jan. 26, 1954 |

FOREIGN PATENTS

| | | |
|---|---|---|
| 797,211 | France | Apr. 23, 1936 |